Patented May 6, 1941

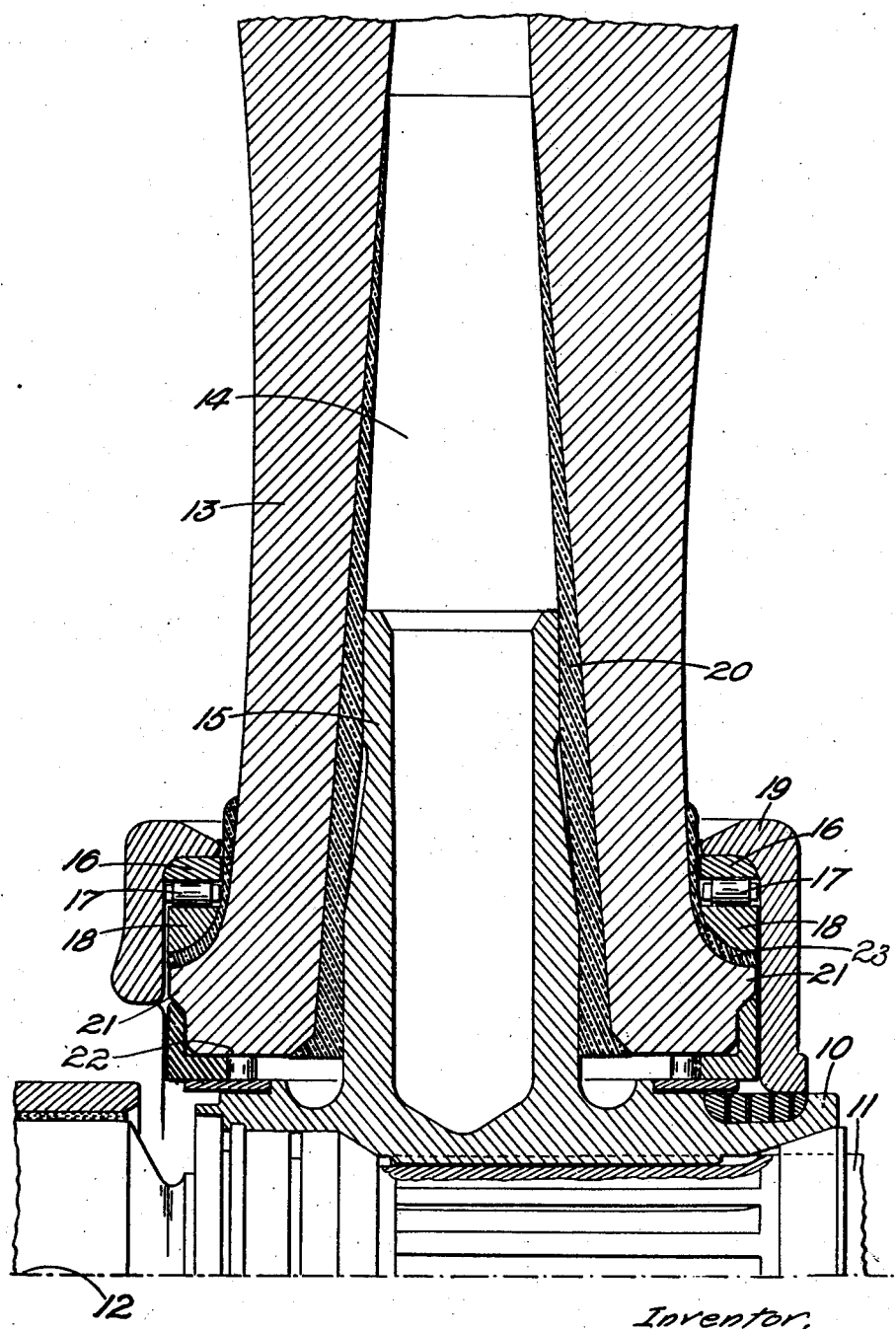

2,240,873

UNITED STATES PATENT OFFICE 2,240,873

MOUNTING OF AIRSCREW BLADES

Frederick Metcalf Thomas, Hatfield, England, assignor to The De Havilland Aircraft Company Limited, Hatfield Aerodrome, Hertfordshire, England Application November 7, 1938, Serial No. 239,386
In Great Britain November 11, 1937

5 Claims. (Cl. 170—162)

This invention relates to airscrew blades and the mounting thereof, particularly such as are of variable pitch. An object of the invention is to provide an improved insulation for the blade mounting against attrition, vibration or shock between the airscrew blade and other parts transmitting load. A further object is to provide an insulation which may avoid the transmission or lessen the effect of unsteady loads, for example those due to engine impulses or blade instability, which in addition to the blade stresses, are already of a high order and of a complex nature, due mainly to centrifugal torque and pitch changing forces.

The invention consists, broadly stated, in the provision of an airscrew or an airscrew blade with an internal bore about which pitch changing rotation takes place on a co-operating driving member, usually in the form of a spider, there being interposed between the bore and driving member a layer of insulating material. Thus according to one aspect of the invention, there is provided an airscrew with blades of the kind having internal bores at the root ends forming a journal for pitch changing rotation on a spider or like supporting bearing part, wherein a layer of vibration insulating material is interposed between the surface of the blade's internal bore and the spider. According to a further feature of the invention, an airscrew blade for a variable pitch airscrew, which is adapted to be mounted for pitch changing rotation between internal and external bearings, has a layer of vibration insulating material both internally and externally thereof interposed between the blade and both such bearing parts, that is, between the blade's bore and the internal bearing on the spider, and between the blade's flange and the external retaining ring or barrel.

In one application of the invention the blades are of the metallic kind, whilst the vibration insulating material is preferably in the nature of a reinforced synthetic resin, a rubber composition, a soft metallic alloy, or metal-containing composition. While the invention has particular reference to blades of variable pitch airscrews mounted between internal and external bearings, it is also applicable to certain forms of fixed and adjustable pitch airscrews. In this case the insulation would be provided between the external part of the blade and a retaining member, and between an internal bore of the blade and a driving member.

In one embodiment of the invention an airscrew blade is provided which has an internal bore adapted to form a journal for pitch changing rotation, and there is moulded to the internal surface thereof, and also on the outer surface at the root end, a layer or covering of suitable insulating material such as synthetic resin, the external layer serving to insulate a thrust bearing allowing pitch changing rotation and the internal layer insulating a journal bearing.

The invention is illustrated in the accompanying drawing in which the figure is a diagrammatic cross section through the root end of an airscrew blade, showing its mounting to the airscrew hub through thrust and journal bearings arranged externally and internally of the shank of the blade.

In the drawing the hub comprises a driving member 10 splined upon the airscrew shaft 11, and supporting at its forward end the hydraulic jack mechanism diagrammatically shown at 12, which serves to effect a pitch change of the blade, whose root or shank is shown in section at 13. The shank is hollowed out at 14 to receive a spider or journal bearing 15 which extends radially from the hub 10, and serves for the transmission of power from the airscrew shaft 11 to the blade. The spider 15, from the point of view of pitch changing rotation about the longitudinal axis of the blade, may thus be considered as fixed. Externally of the blade shank there is a thrust bearing comprising a relatively fixed race 16, rollers 17 and a race 18, the latter being non-rotatably carried on the blade shank 13. The race 16 is carried in the support, retaining ring, or barrel 19 secured to the hub, whereby centrifugal thrust loads in the blade are transmitted to the hub.

The insulating layer is diagrammatically indicated at 20, and as shown covers the whole surface of the internal bore 14 for some distance from the root, and extends by a thin film 22 to the external surface of the blade shank 13 and over the outer surface of the blade's flange 21, as shown at 23, where it is interposed between the race 18 and the blade 13. Preferably the insulating material is of reinforced synthetic resin or a rubber composition, and may be moulded in situ so as to cover the entire root end as shown in the drawing.

It will be noted that the internal insulating layer is interposed between the blade 13 and spider journal 15, and within the internal bore is relatively thick, whilst adjacent the collar or flange 21 on the blade externally thereof, the insulation is again thickened. It will be appreciated that the flange 21 serves as an abutment transmitting the thrust loads in the blades to the race 18, and thus between the parts it is preferable to provide increased thickness of insulating material. It can thus be arranged that there is no metallic contact between the blade and hub which might give rise to the transmission of undesirable vibration or impulsive stresses.

Although in the embodiment illustrated the insulation is shown as continuous from the internal part thereof to the external part, these parts may be separate and one or both may be moulded in situ. The internal cone shaped insulation 20 may be preformed in any convenient manner and pushed into the bore of the blade, the tapered part thereof serving to secure the insulation in position, whilst the external part 23 of the insulating material may be made as a split collar which can be slipped over the tip of the blade to the blade shank and this collar may be cemented or otherwise fixed in position. The internal and external parts may be of the same or different material and the internal part may incorporate metal liners to act as bearing surfaces for the spider member.

What I claim is:

1. In an airscrew, in combination, blades each formed with an internal bore at the root end, a hub including radial spider arms each received within such a bore to constitute internal radial bearing means, and including external bearing means surrounding each blade root and concentric with the corresponding spider arm, and a layer of synthetic resin or the like, molded in situ, and interposed between and effecting a close bearing fit between the blade root and each of the internal and external bearing means.

2. The combination according to claim 1, where the external and the internal layers of synthetic resin or the like are formed integrally, as one piece.

3. In an airscrew, in combination, a hub including radial spider arms, blades each formed with an internal bore at the root end, wherein is received a spider arm, a layer of synthetic resin or the like, molded in situ, and interposed between and centering the spider within the bore, to form a close radial journal bearing for the root end of the blade upon the hub, a retaining ring surrounding the root end of the blade and secured upon the hub, a thrust bearing reacting between the retaining ring and the blade root, and a similar layer of synthetic resin or the like, molded in situ and similarly interposed between the blade root and the retaining ring.

4. The combination according to claim 1, wherein the external and internal layers of molded synthetic resin or the like are so disposed as to prevent any contact between the blade and the hub, or parts thereof or carried thereby.

5. The combination according to claim 1, wherein the two layers of molded synthetic resin, or the like, internally and externally of the blade root are formed integrally, as one piece, and are thickened in regions of maximum stress.

FREDERICK M. THOMAS.